(12) United States Patent
Wang et al.

(10) Patent No.: US 8,018,318 B2
(45) Date of Patent: Sep. 13, 2011

(54) RESISTIVE COMPONENT AND METHOD OF MANUFACTURING THE SAME

(75) Inventors: Chung-Hsiung Wang, Hsin Chu (TW); Hideo Ikuta, Hsin Chu (TW); Wu-Liang Chu, Miao Li County (TW); Yen-Ting Lin, Tai Chung (TW); Chih Sheng Kuo, Miao Li County (TW); Wen-Hsiung Liao, Hsin Chu County (TW)

(73) Assignee: Cyntec Co., Ltd., Hsin-chu (TW)

( * ) Notice: Subject to any disclaimer, the term of this patent is extended or adjusted under 35 U.S.C. 154(b) by 324 days.

(21) Appl. No.: 12/482,948

(22) Filed: Jun. 11, 2009

(65) Prior Publication Data

US 2010/0039211 A1 Feb. 18, 2010

(30) Foreign Application Priority Data

Aug. 13, 2008 (TW) ................................ 97130754 A (51) Int. Cl.
*H01C 7/18* (2006.01)
(52) U.S. Cl. ........................................ 338/204; 338/309
(58) Field of Classification Search .................. 338/204, 338/307, 309
See application file for complete search history.

(56) References Cited

U.S. PATENT DOCUMENTS

| 4,677,413 | A | 6/1987 | Zandman et al. |
| 5,037,670 | A | 8/1991 | Kuo et al. |
| 6,529,115 | B2 | 3/2003 | Szwarc et al. |
| 6,727,798 | B2 | 4/2004 | Akhtman et al. |
| 6,873,028 | B2 | 3/2005 | Belman |
| 7,089,652 | B2 | 8/2006 | Akhtman et al. |
| 7,154,370 | B2 | 12/2006 | Szwarc et al. |
| 7,197,940 | B2 * | 4/2007 | Ziebart et al. ................ 73/781 |
| 7,278,201 | B2 | 10/2007 | Szwarc et al. |
| 2005/0155435 | A1 * | 7/2005 | Ziebart et al. ................ 73/781 |
| 2010/0039211 | A1 * | 2/2010 | Wang et al. ................ 338/204 |

FOREIGN PATENT DOCUMENTS

| CN | 02152720.2 | 8/2003 |
| JP | 2001-110601 | 4/2001 |

* cited by examiner

*Primary Examiner* — James Harvey
(74) *Attorney, Agent, or Firm* — Muncy, Geissler, Olds & Lowe, PLLC (57) ABSTRACT

A resistive component suitable for detecting electric current in a circuit and a method of manufacturing the resistive component are provided. The resistive component includes a carrier, a resistive layer, an electrode unit, an upper oxide layer and a protective layer. The resistive layer comprises copper alloy and is disposed on the carrier. The electrode unit is electrically connected to the resistive layer. The upper oxide layer is disposed on a part of a surface of the resistive layer and includes oxides of the resistive layer. The protective layer covers at least a part of the upper oxide layer.

22 Claims, 6 Drawing Sheets

RESISTIVE COMPONENT AND METHOD OF MANUFACTURING THE SAME

BACKGROUND OF THE INVENTION (a) Field of the Invention

The present invention relates to a resistive component, particularly to a resistive component suitable for detecting electric current and a method of manufacturing the same.

(b) Description of the Related Art

Generally, an electronic device is provided with a resistive component, being a passive component, for detecting electric current. The resistive component suitable for detecting electric current generally has a low resistance value and a low temperature coefficient of resistance (TCR).

A conventional resistive component is disclosed in U.S. Pat. No. 7,238,296, that has a resistive layer be printed on a substrate by a printing technique and then be covered by a glass layer. Its resistance value is adjusted by a laser trimming technique. Finally, the glass layer is covered with a protective layer. The resistive layer is made of an alloy formed by blending Cu—Mn—Ge metallic powders and copper-oxide powders to reduce its resistance value and TCR. Besides glass powders are added into the resistive layer as a binder in order to have better adhesion between the substrate and the resistive layer. However, the glass powders form impurities so that the TCR of the resistive layer cannot be controlled easily. In addition, if the percentage of the glass powders and the copper-oxide powders is too high, such as higher than 10 wt %, the resistance value of the resistive layer is increased and the porous structure forms in the resistive layer. A rather elaborate control of the added quantity of the glass and copper-oxide powders is therefore required during the manufacturing process. The resistive component is required to be sintered in a nitrogen environment at 960° C.~980° C. in the manufacturing process. The copper in the resistive component, however, is easy to be oxidized which makes the manufacturing process become more difficult.

Another conventional resistive component is disclosed in U.S. Pat. No. 6,771,160, that uses a process like vaporization, sputtering, chemical plating or electroplating deposition to deposit a plurality of resistive layers on a copper foil and then has them be embedded into a printed circuit board (PCB). The resistive layers are made of different alloys or oxides and form a parallel circuit so that the resistive components having different resistance value are manufactured. The use of the vaporization or sputtering deposition process, however, results in high manufacture cost and the process of etching the resistive layers is relatively difficult.

BRIEF SUMMARY OF THE INVENTION

One object of the invention is to provide a resistive component having a low resistance value and a low TCR and a method of manufacturing the same.

Another object of the invention is to provide a resistive component and a method of manufacturing the same. By providing an upper oxide layer, the adhesion between a resistive layer and a protective layer is increased and the higher stability of the resistive component under high temperature can be achieved.

Still another object of the invention is to provide a method of manufacturing a resistive component that can simplify manufacturing processes and increase the stability of the manufacturing process.

To achieve one or all of the objects of the invention, a resistive component according to one embodiment of the invention is provided, suitable for detecting electric current in a circuit. The resistive component comprises a carrier, a resistive layer disposed on the carrier, an electrode unit electrically connected to the resistive layer, an upper oxide layer directly disposed on a part of the resistive layer, and a protective layer covering a part of the upper oxide layer. The resistive layer comprises copper alloy and the upper oxide layer comprises the oxide of the copper alloy. The upper oxide layer can increase the adhesion and contact area between the resistive layer and the protective layer and thereby the higher stability of the resistive component under high temperature can be achieved. In addition, since the upper oxide layer comprises the oxide of the copper alloy that has the resistance value and TCR respectively close to the copper alloy of the resistive layer, the characteristic of the resistive component is not significantly influenced.

A method of manufacturing a resistive component according to one embodiment of the invention comprises the following steps: providing a multilayer laminated plate made of a substrate and a resistor having copper alloy; removing a part of the resistor to form a plurality of resistive layers separated from each other; performing oxidation treatment to form a roughened surface having oxide of the copper alloy on a part of the resistive layers; forming a protective layer on the roughened surface; and cutting the laminated plate to form the resistive component. Thus, the method can simplify manufacturing processes and increase the stability of the manufacturing process.

DETAILED DESCRIPTION OF THE INVENTION

The above mentioned and other technical contents, characteristics, and effects of the invention can be illustrated more clearly by the following detailed descriptions together with the corresponding figures. The wording describing directions used in the following descriptions, such as: up, down, left, right, front, back or the like, indicates the directions with respect to the figure only. Therefore, the wording used to describe directions is for illustration but not to limit the scope of the invention.

Figure 1:
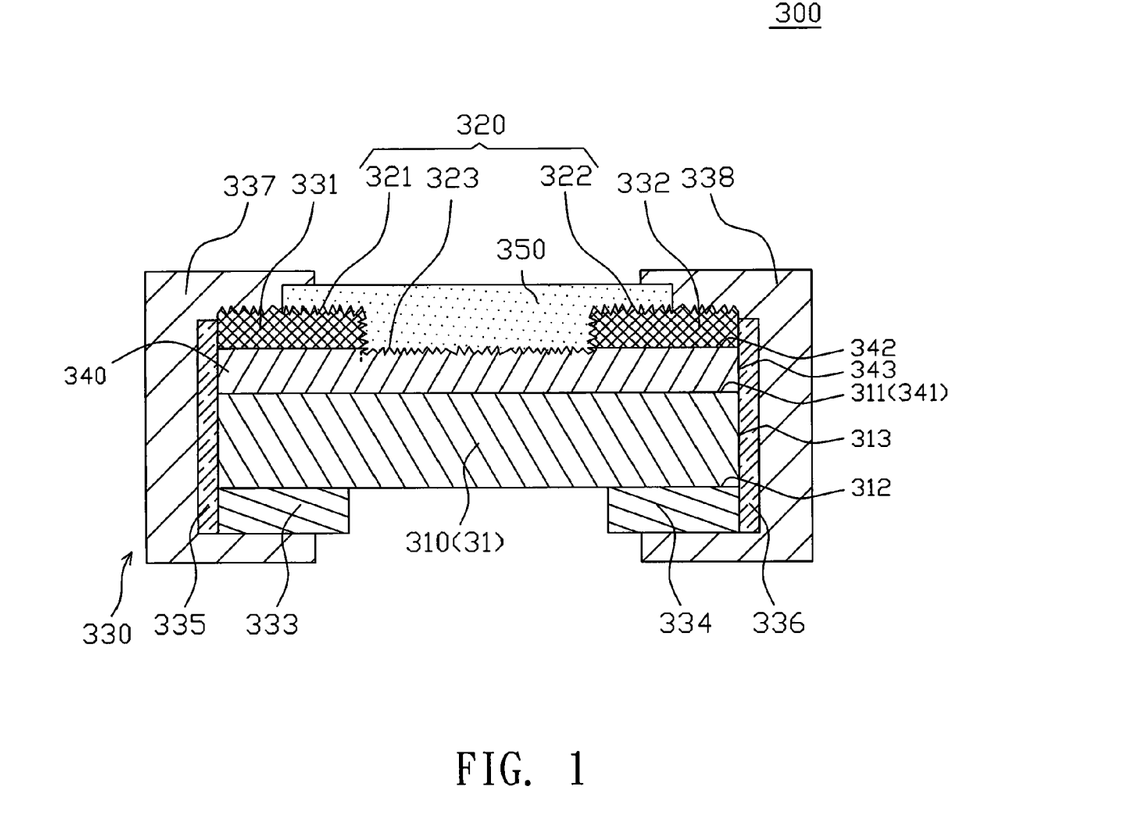
FIG. 1 shows a schematic diagram illustrating the cross-section of the resistive component according to one embodiment of the invention.

FIG. 1 shows a cross sectional view of a resistive component 300 according to one embodiment of the invention. The resistive component 300 is suitable for detecting electric current in a circuit and has a low resistance value and a low temperature coefficient of resistance (TCR). Preferably, its resistance value is lower than about 10 mΩ and its TCR is lower than about $100 \times 10^{-6}$/K (ppm/K).

The resistive component 300 comprises a carrier 31, a resistive layer 340, an electrode unit 330, an upper oxide layer 320, and a protective layer 350. The carrier 31 includes a substrate 310. The substrate 310 is made of insulating material having a good thermal conducting property, such as the alumina ($Al_2O_3$). The substrate 310 includes an upper surface 311, a lower surface 312 opposite to the upper surface 311, and a side surface 313 connecting the upper surface 311 and the lower surface 312.

The resistive layer 340 is disposed on the upper surface 311 of the substrate 310 and comprises copper alloy. The copper alloy is either nickel copper alloy whose nickel and copper are main compositions or manganese copper alloy whose manganese and copper are main compositions. The resistive layer 340 can be formed onto the substrate 310 directly by the thin film process, such as the sputtering or the evaporating deposition process. The resistive layer 340 includes a first surface 341, a second surface 342 opposite to the first surface 341, and a side surface 343 connecting the first surface 341 and the second surface 342. The first surface 341 is disposed on the upper surface 311 of the substrate 310. In this embodiment, the thickness of the resistive layer 340 is about between 0.2 mm and 0.6 mm.

The electrode unit 330 comprises a pair of upper electrodes 331 & 332. The upper electrodes 331 & 332 are electrically connected to the resistive layer 340 but are mutually separated from each other. In this embodiment, the upper electrodes 331 & 332 can be the conductive bumps disposed respectively on the two sides of the second surface 342 of the resistive layer 340 to cover a part of the second surface 342 of the resistive layer 340. The upper electrodes 331 & 332 can be made of copper.

The upper oxide layer 320 is disposed directly on a part of the second surface 342 of the resistive layer 340 and on the surfaces, away from the resistive layer 340, of the upper electrodes 331 & 332. The upper oxide layer 320 is a roughened surface formed by performing oxidation treatment, in which a wet etching process is used, on a part of the resistive layer 340 and a part of the upper electrode layers 331 & 332. More specifically, an embodiment of the invention can utilize brown or black oxidation treatment. Preferably, the brown oxidation treatment is used to form the upper oxide layer 320 made of copper alloy oxide so that the resistivity of the upper oxide layer 320 is substantially the same as that of the resistive layer 340. The centerline average roughness (Ra) of the roughened surface is about 1100±500 Å, that is about between 600 Å and 1600 Å. In this embodiment, the upper oxide layer 320 comprises a first oxide layer 321 that covers the upper electrode 331, a second oxide layer 322 that covers the upper electrode 332, and a third oxide layer 323 that covers the portion of the second surface 342 of the resistive layer 340 which is not disposed with the upper electrodes 331 & 332. The thickness of the upper oxide layer 320 is set to be about between 40 μm and 100 μm, which is far less than the thickness of the resistive layer 340, so that the variance of the temperature coefficient of resistance of the resistive component can be reduced. Part of the material composition of the upper oxide layer 320 comprises at least the oxide of the resistive layer 340. More specifically, the first oxide layer 321 and the second oxide layer 322 comprise, at least, the oxide of the upper electrodes 331 & 332 while the third oxide layer 323 comprises, at least, the oxide of the resistive layer 340.

The protective layer 350 covers, at least, the third oxide layer 323. In this embodiment, the material of the protective layer 350, for example, can be acrylic or epoxy resin. The protective layer 350 also covers the part of the first oxide layer 321 and the part of the second oxide layer 322 that are respectively near the third oxide layer 323.

The electrode unit 330 further comprises a pair of lower electrodes 333 & 334, a pair of terminal electrodes 335 & 336, and a pair of external electrodes 337 & 338. The lower electrodes 333 & 334 are mutually separated from each other and are disposed on the two sides of the lower surface 312 of the substrate 310 separately. The terminal electrodes 335 & 336 are separately disposed on the side surface 313 of the substrate 310 and the side surface 343 of the resistive layer 340. The two ends of each terminal electrode are electrically coupled to the corresponding lower electrode and upper electrode separately. More specifically, the two ends of the terminal electrode 335 are electrically coupled to the lower electrode 333 and the upper electrode 331 separately while the two ends of the terminal electrode 336 are electrically coupled to the lower electrode 334 and the upper electrode 332 separately. The terminal electrodes 335 & 336 can be made of metallic material selected from titanium (Ti), chromium (Cr), copper (Cu), nickel (Ni), nickel chromium alloy, titanium tungsten alloy or the like. The external electrodes 337 & 338 cover the terminal electrodes 335 & 336, part of the upper electrodes 331 & 332, and part of the lower electrodes 333 & 334 and are electrically connected to the terminal electrodes 335 & 336, the upper electrodes 331 & 332, and the lower electrodes 333 & 334. The external electrodes 337 & 338 are of multilayer structures. More preferably, the external electrodes are formed, from inside to outside separately and layer by layer in sequences such as copper layer, nickel layer, and tin layer or the like, by coating technique like the barrel plating method. The nickel layer is used as the buffer layer while the tin layer is used for soldering with other external devices.

The upper oxide layer 320 with a roughened surface is disposed directly on the resistive layer 340 and the upper electrodes 331 & 332 for increasing the contact surface area and the adhesion between the protective layer 350, the resistive layer 340, and the upper electrodes 331 & 332 so that the reliability and the durability of the resistive component 300 can be increased. Furthermore, the upper oxide layer 320 formed by the oxidation treatment of the resistive layer 340 can be used as a passivation layer to block the influence of amine contained in the liquid resin on the resistive layer 340 when the protective layer 350 is liquidized due to high temperature and thereby to increase the stability of the resistive component 300 under high temperature. Besides, in this embodiment, since the electrical resistivity and the temperature coefficient of resistance (TCR) of copper alloy oxide are similar to those of copper alloy, as the resistive layer 340 is made of copper alloy and the upper oxide layer 320 is formed by directly oxidizing a part of the second surface 342 of the resistive layer 340, the characteristics of the resistive component 300 will not be influenced. Therefore, in addition to the increase of the reliability and the stability under high temperature, the resistive component 300 according to an embodiment of the invention can also maintain the low resistance value and the low temperature coefficient of resistance necessary for the resistive component to sense electric current. It is worth mentioning that the conventional resistive layer is made of copper. Since the temperature coefficient of resistance of copper is very high, the temperature coefficient of resistance of the complex of copper and copper oxide formed by the oxidation treatment of copper is higher than that of the complex of copper alloy and the oxide of the copper alloy. Therefore, the low TCR (lower than $100 \times 10^{-6}$/K) necessary for sensing electric current is difficult to achieve.

The resistive component 300 shown in FIG. 1 undergoes the characteristic test. The resistive layer 340 is made of copper alloys listed in Table 1 (such as: CuNi44 and CuMn12Ni) and the upper oxide layer 320 is formed by the brown oxidation treatment. The results are shown in Table 2 and Table 3. In Table 2, the resistive layer 340 is made of nickel copper alloy CuNi44 while the resistance value of the resistive component 300 is about 5 mΩ and about 10 mΩ. In Table 3, the resistive layer 340 is made of manganese copper alloy CuMn12Ni while the resistance value of the resistive component 300 is about 1 mΩ. From Table 2, as the resistance value is 10 mΩ, the average TCR is 24.52 ppm/K. As the resistance is 5 mΩ, the average TCR is 6.6 ppm/K. From Table 3, as the resistance value is 1 mΩ, the average TCR is 108 ppm/K. Therefore, it can be proved that the resistive component 300 according to this embodiment of the invention can achieve the low resistance value (less than 10 mΩ) and the low TCR (less than $100 \times 10^{-6}$/K). It should be noted that the temperature during measuring the electrical resistivity is set to be 20° C., the temperature during measuring TCR is set between 20° C. and 105° C., and the temperature during measuring the thermo electromotive force (thermo EMF) is set to be 20° C.

TABLE 1

| Alloy | Compositions (wt %) | | | | Electrical Resistivity ($\Omega mm^2/m$) | Temperature coefficient of resistance ($10^{-6}$/K) | Thermo electromotive force (mV/K) |
| --- | --- | --- | --- | --- | --- | --- | --- |
| | Copper | Nickel | Manganese | Iron | | | |
| CuNi44 | 55 | 44 | 0 | 1 | 0.49 | −80~40 | −40 |
| CuMn12Ni | 86 | 2 | 12 | 0 | 0.43 | −50~50 | −1 |

TABLE 2

| | Sample | Resistance value (mΩ) | | Temperature coefficient of resistance ($10^{-6}$/K) |
| --- | --- | --- | --- | --- |
| | | 25° C. | 125° C. | |
| 10 mΩ | 1 | 10.440 | 10.461 | 20.11 |
| | 2 | 10.321 | 10.356 | 33.91 |
| | 3 | 10.393 | 10.425 | 30.79 |
| | 4 | 10.330 | 10.349 | 18.39 |
| | 5 | 10.319 | 10.339 | 19.38 |
| 5 mΩ | 1 | 5.496 | 5.491 | −9 |
| | 2 | 5.427 | 5.429 | 4 |
| | 3 | 5.483 | 5.489 | 11 |
| | 4 | 5.529 | 5.532 | 5 |
| | 5 | 5.487 | 5.489 | 4 |

TABLE 3

| Samples | Resistance value (mΩ) | | Temperature coefficient of resistance ($10^{-6}$/K) |
| --- | --- | --- | --- |
| | 25° C. | 125° C. | |
| 1 | 0.966 | 0.978 | 124 |
| 2 | 0.975 | 0.985 | 103 |
| 3 | 0.973 | 0.984 | 113 |
| 4 | 0.963 | 0.973 | 104 |
| 5 | 0.959 | 0.969 | 104 |
| 6 | 0.956 | 0.966 | 105 |
| 7 | 0.967 | 0.978 | 114 |
| 8 | 0.964 | 0.974 | 104 |
| 9 | 0.961 | 0.971 | 104 |
| 10 | 0.966 | 0.976 | 104 |

Figure 2:
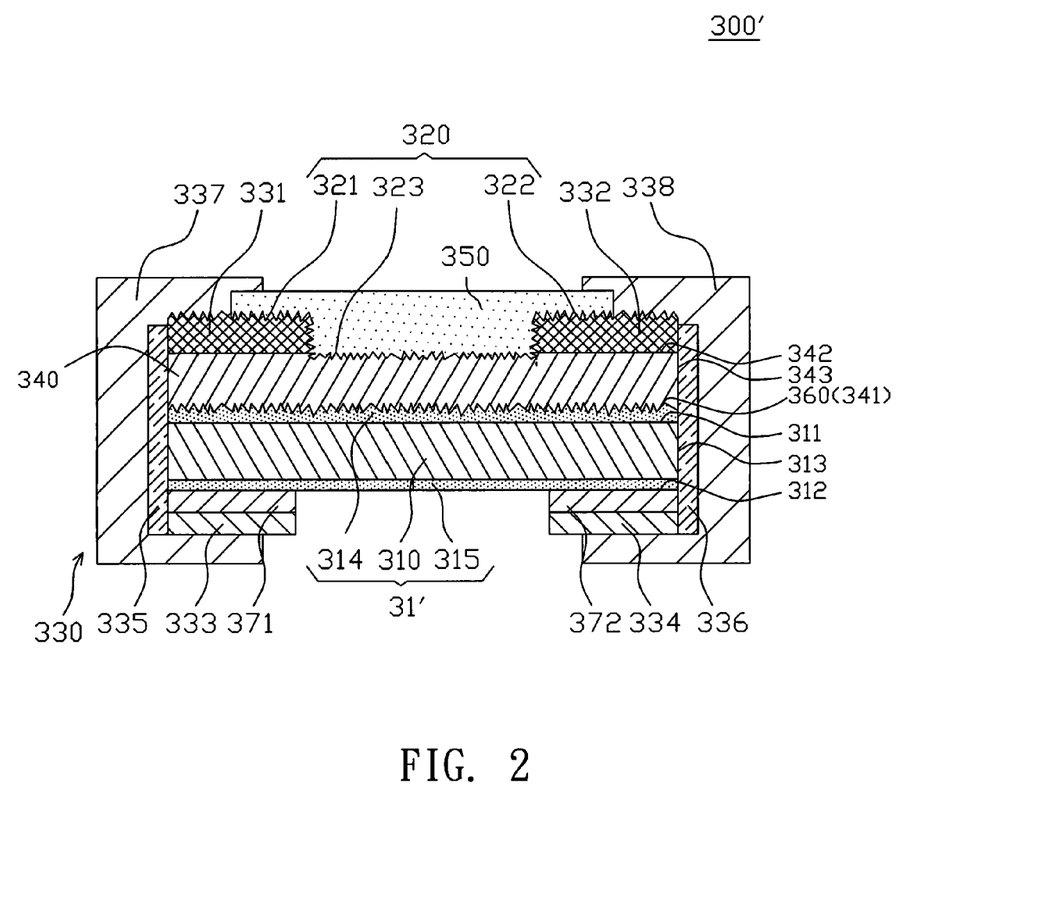
FIG. 2 shows a schematic diagram illustrating the cross-section of the resistive component according to another embodiment of the invention.

FIG. 2 shows a schematic diagram illustrating the cross-section of the resistive component 300' according to another embodiment of the invention. For convenience in explanation, the components of the resistive component 300' that are the same as the components of the resistive component 300 will be assigned the same component symbols. The differences between the current embodiment and the previous embodiment are that the resistive component 300' further comprises a lower oxide layer 360 and a heat dissipating unit and the carrier 31' further comprises an upper adhesive layer 314 and a lower adhesive layer 315.

The lower oxide layer 360 is a roughened surface formed by oxidizing the first surface 341 of the resistive layer 340 by a wet etching process. The material of the lower oxide layer 360 comprises at least the oxide of the resistive layer 340, that is, includes the oxide of the copper alloy. The role and the function of the lower oxide layer 360 are the same as those of the upper oxide layer 320 and will not be repeated hereinafter.

The carrier 31' comprises a substrate 310 made of alumina, an upper adhesive layer 314 disposed on the upper surface 311 of the substrate 310, and a lower adhesive layer 315 disposed on the lower surface 312 of the substrate 310. The upper adhesive layer 314 is disposed between the resistive layer 340 and the substrate 310. The upper adhesive layer 314 utilizes the lower oxide layer 360 having a roughened surface to tightly bond with the resistive layer 340 so that the resistive layer 340 can be more securely bonded with the carrier 31'. The upper adhesive layer 314 and the lower adhesive layer 315 can be a plastic film for providing the adhesive force needed when the substrate 310 bonds with other components. The material of the upper adhesive layer 314 and the lower adhesive layer 315 can be made of epoxy resin. Preferably, the upper adhesive layer 314 and the lower adhesive layer 315 are heat dissipating plates for conducting the heat generated by the resistive layer 340 to outside of the resistive component 300'. The material of the heat dissipating plate can be made of epoxy resin containing aluminum nitride (AlN) powders and alumina ($Al_2O_3$) powders.

The heat dissipating unit is formed between the lower adhesive layer 315 and the lower electrodes 333 & 334 separately. In this embodiment, the heat dissipating unit comprises a first metal layer 371 and a second metal layer 372, that are bonded to the lower surface of the lower adhesive layer 315. The first metal layer 371 and the second metal layer 372 are made of copper.

By providing the upper adhesive layer 314 and the lower adhesive layer 315, the resistive component 300' can be produced by the lamination process. Compared to the resistive component 300, the production cost for the resistive component 300' can be saved. The utilization of the lower oxide layer 360 can increase the contact surface and the adhesive force between the layers of the resistive component 300' to achieve better reliability and durability. By utilizing heat dissipating plates as the upper adhesive layer 314 and the lower adhesive layer 315 in addition to the utilization of the heat dissipating unit, the heat generated by the resistive layer 340 can be dissipated more easily. Thus, the heating dissipating effect of the resistive component 300' of this embodiment is better.

Figure 3A:
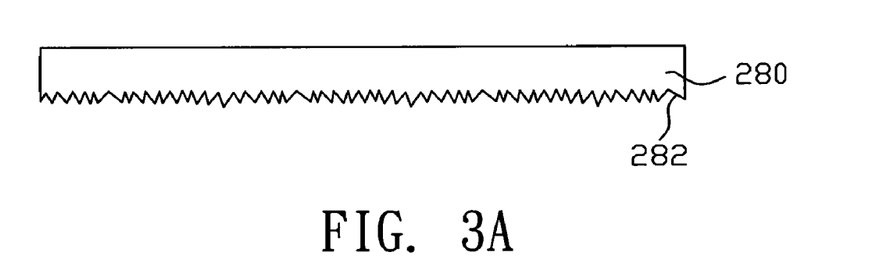
FIGS. 3A to 3J show process flow schematic diagrams illustrating the method of manufacturing the resistive component according to one embodiment of the invention.
Figure 3B:
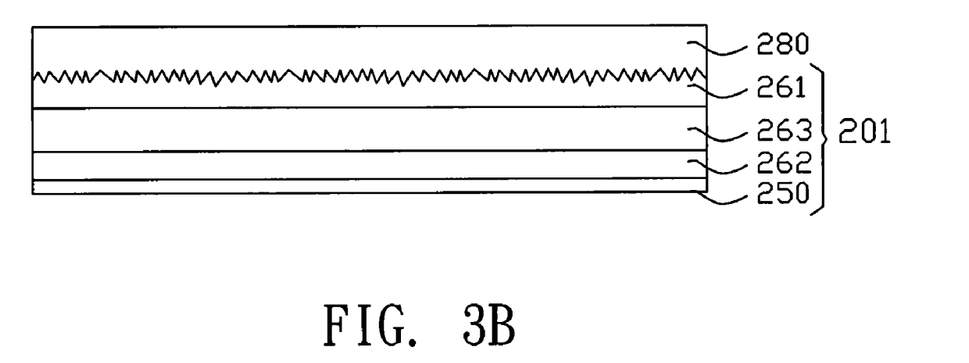
Figure 3C:
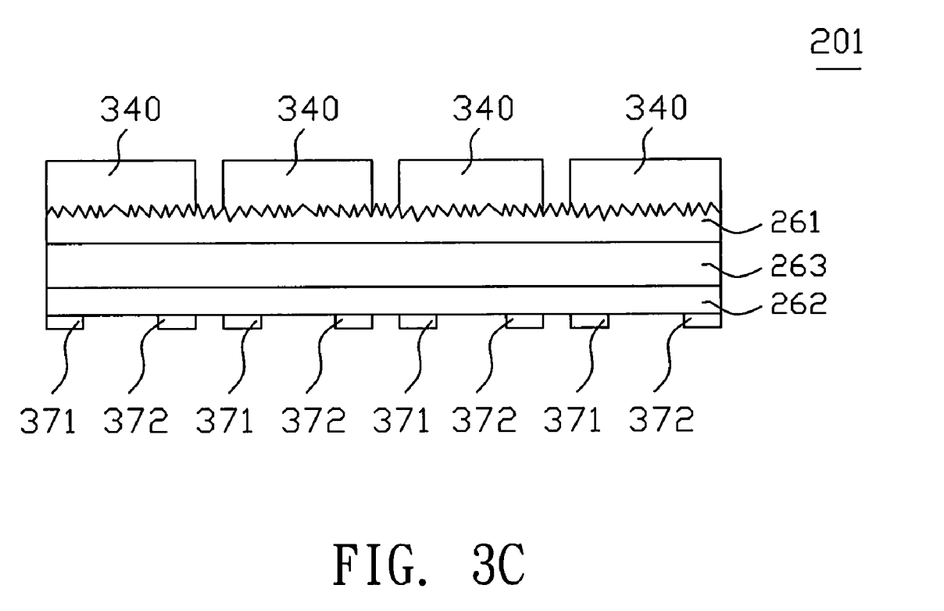
Figure 3D:
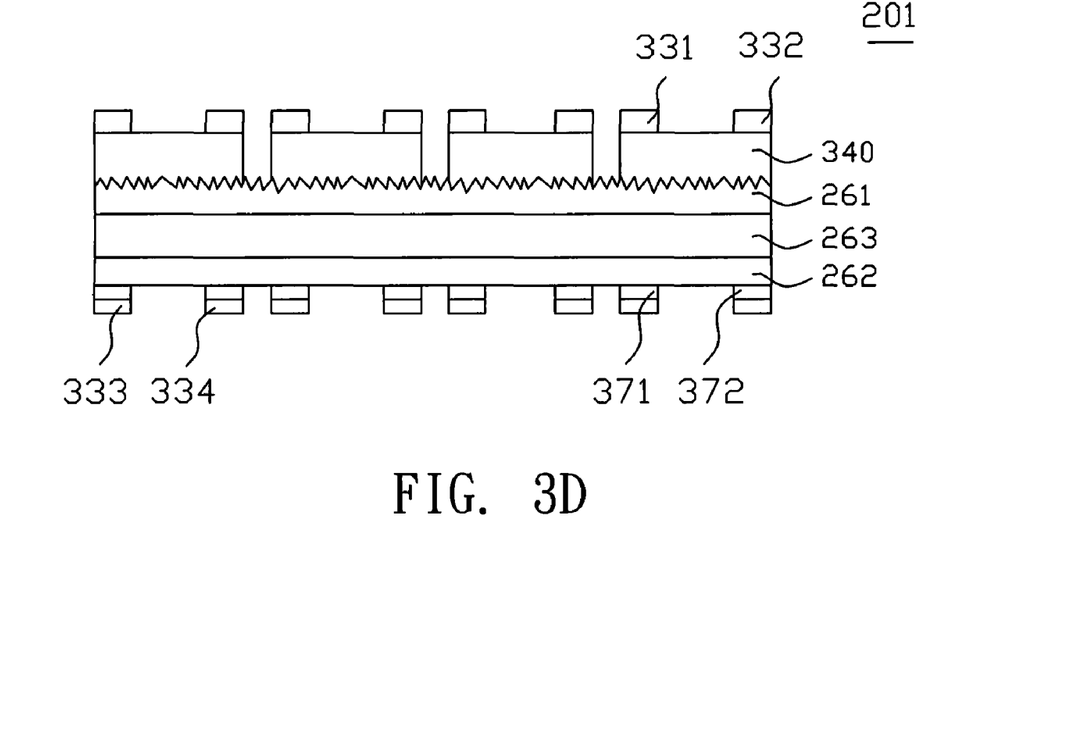
Figure 3E:
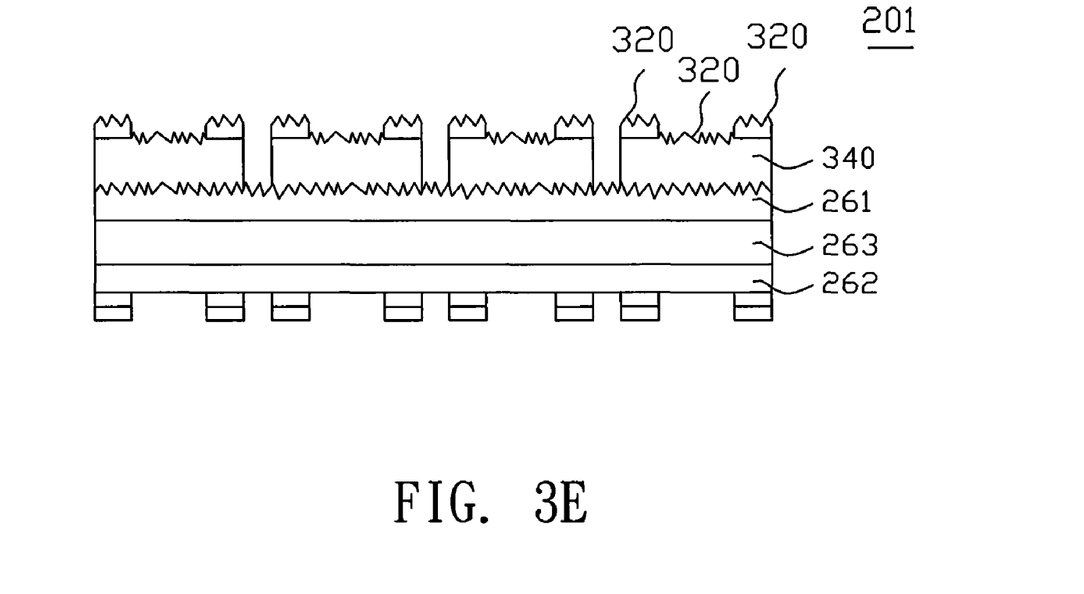
Figure 3F:
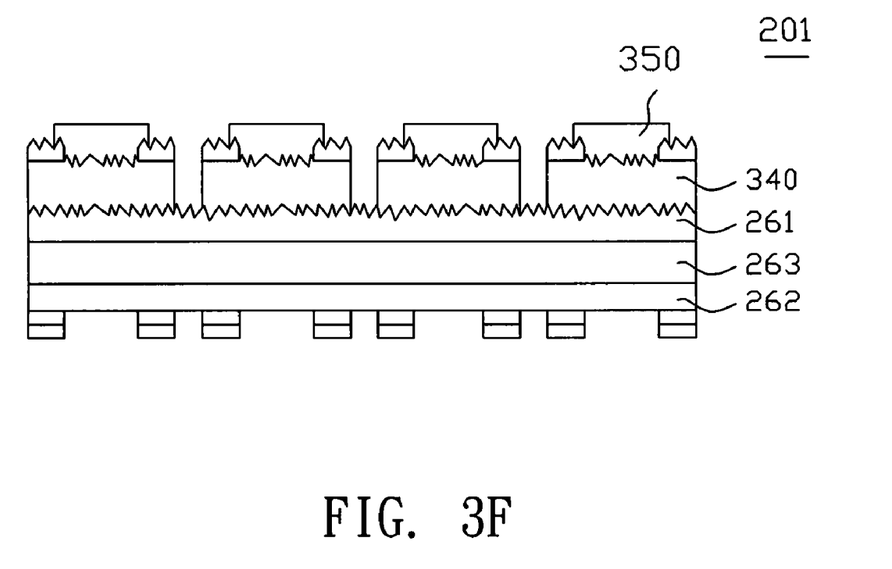
Figure 3G:
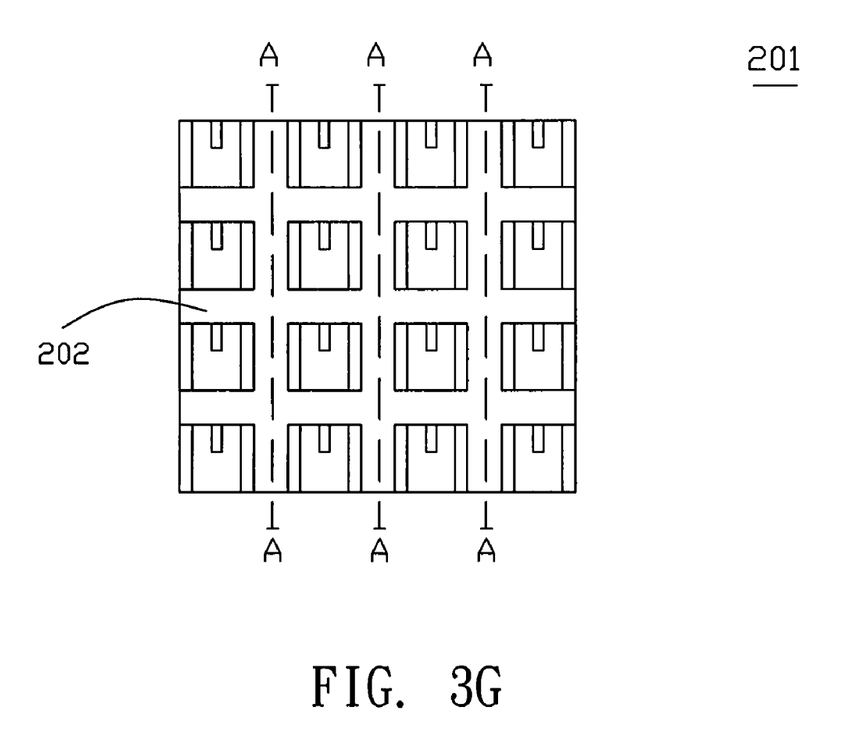
Figure 3H:
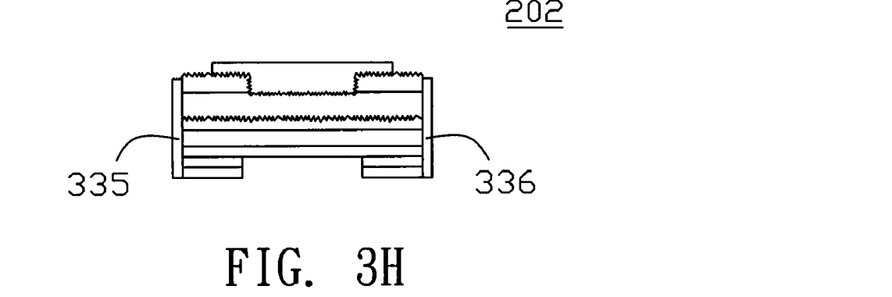
Figure 3I:
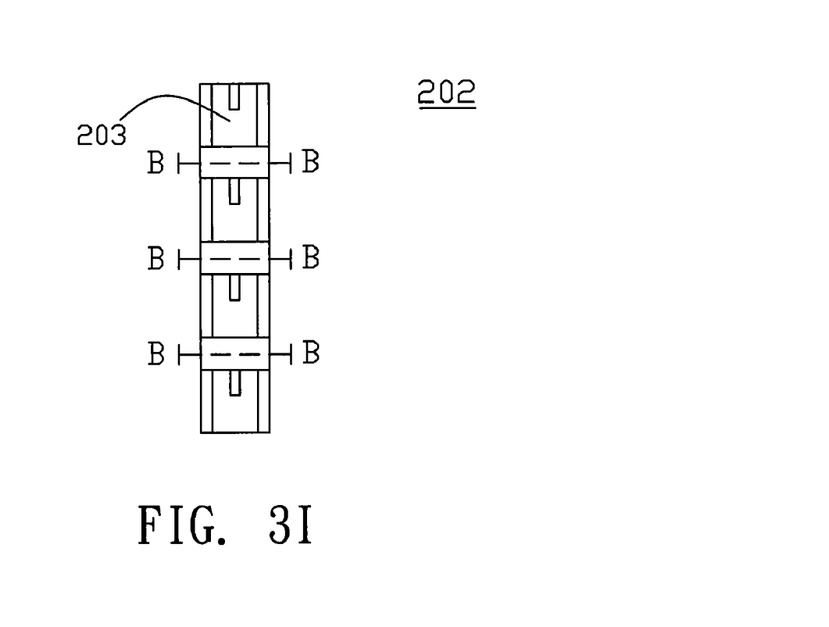

FIGS. 3A to 3J show process flow schematic diagrams illustrating the methods of manufacturing the resistive components 300 and 300' according to one embodiment of the invention. The method comprises: (A) providing a multilayer laminated plate formed by a resistor comprising copper alloy and a substrate; (B) removing a part of the resistor to form a plurality of resistive layers separated from each other; (C) forming a plurality of conductive bumps on the resistive layers; (D) performing oxidation treatment to form a roughened surface comprising copper alloy oxide on a part of the resistive layer; (E) forming a protective layer on the roughened surface; and (F) cutting the laminated plate to form the resistive component. Detailed descriptions for each step will be given in the following. FIGS. 3A to 3F and FIGS. 3H and 3J show the side view of one step of the manufacturing process for the resistive component according to one embodiment of the invention. FIG. 3G and FIG. 3I show the top view of one step of the manufacturing process for the resistive component according to one embodiment of the invention.

FIG. 3A and FIG. 3B show the step (A) of providing a multilayer laminated plate formed by a resistor comprising copper alloy and a substrate. Firstly, as shown in FIG. 3A, a resistive plate 280 made of copper alloy is provided as the resistor. Then, oxidation treatment is performed on the first surface of the resistive plate 280 to form a lower oxide layer 282 on the first surface of the resistive plate 280. The oxidation treatment can be a wet etching process. That is, the first surface is soaked in the etchant or the etchant is sprayed onto the first surface. The etchant is used to perform micro etching reaction and the organic attaching reaction on the resistive plate to form copper alloy oxide made of divalent copper with brown color, or copper alloy oxide made of cuprous with black color. A roughened surface made of copper alloy oxide is formed on the first surface of the resistive plate 280. In this embodiment, the CO-BRA BOND process by the Rockwood Electrochemical ASIA Ltd is used. The etchant can comprise an oxidant and an additive while the additive includes a topography modifier and a promoter. In this embodiment, sulfuric acid and hydrogen peroxide are utilized as the oxidant and thus copper alloy oxide is brown and is made of divalent copper. Then, as shown in FIG. 3B, the resistive plate 280 is laminated with a upper plastic plate 261, a substrate 263, a lower plastic plate 262 and a metal plate 250 to form a multilayer laminated plate. More specifically, the metal plate 250, the lower plastic plate 262, the substrate 263, and the upper plastic plate 261 are placed in sequence. Then, the lower oxide layer 282 of the resistive plate 280 is placed, facing the upper plastic plate 261, on the upper plastic plate 261. The lamination step is performed. The metal plate 250 can be a copper plate or a resistive plate. In addition, besides using a lamination method to form the multilayer laminated plate, a thin film process can also be used to form the multilayer laminated plate. More specifically, the vaporization process or the sputtering deposition process can be utilized to form the resistive film made of copper alloy (not shown in the figure) on the substrate. The resistive film is used as the resistor and the multilayer laminated plate is formed by combining the substrate and the resistive film.

FIG. 3C shows the step (B) of removing a part of the resistor to form a plurality of resistive layers separated from each other. The resistor (the resistive plate 280 or the resistive film) and the metal plate 250 are initially coated with a photoresist layer. Then, a part of the resistor (the resistive plate 280 or the resistive film) and the metal plate 250 are removed by utilizing the lithography technique. A plurality of separated portions is partitioned on the resistor and the metal plate 250 to form the resistive layer 340 and the metal layers 371, 372. More specifically, each partitioned portion is a resistive component that comprises a resistive layer 340, a first metal layer 371, and a second metal layer 372.

FIG. 3D shows the step (C) of forming a plurality of conductive bumps on the resistive layer. Lithography and plating techniques are utilized to form mutually separated conductive bumps on the second surface 342 of the resistive layer 340 as the upper electrodes 331 & 332. Then, lithography and plating techniques are utilized to form conductive bumps on the first metal layer 371 and the second metal layer 372 as the lower electrodes 333 & 334.

FIG. 3E shows the step (D) of performing oxidation treatment to form a roughened surface comprising copper alloy oxide on a part of the resistive layer. This step uses an etchant to perform oxidation treatment on the upper surface of the laminated plate 201 to form an upper oxide layer 320 having a roughened surface on the second surface of the resistive layer 340 and the upper surface of the upper electrodes 331 & 332. Or, before forming the plurality of conductive bumps, the etchant is used to perform oxidation treatment on the surface of the resistive layer 340 so that the roughened surface is formed only on the resistive layer 340. More specifically, the oxidation treatment can be a wet etching process. That is, the laminated plate 201 is placed into a prepreg tank containing an etchant so that the upper surface of the laminated plate 201 contacts the etchant. Or, an etchant is sprayed onto the upper surface of the laminated plate 201 so that the etchant is absorbed on the upper surface of the laminated plate 201. Then, the etchant performs the etching reaction and organic attaching reaction on the resistive layer and the upper electrode to form copper alloy oxide made of divalent copper with brown color, or copper alloy oxide made of cuprous with black color. The organics are randomly attached to the upper surface of the laminated plate 201 during the process. The portion of the surface that is covered with the organics will not be etched while the portion that is not covered with the organics will be etched. The etchant can comprise an oxidant and an additive while the additive includes a topography modifier and a promoter. In this embodiment, since the etchant comprises oxidants (that is, sulfuric acid and hydrogen peroxide) and the additives, copper alloy oxide made of divalent copper is formed. It should be noted that the etching speeds for the nickel, manganese, and copper contained in the copper alloy are different. The etching speed of nickel is slower than that of the copper while the etching speed of manganese is faster than that of the copper. Therefore, different surface roughness can be obtained when copper alloy of different compositions undergoes the wet etching process. Hence, different copper alloys made of different nickel, manganese, and copper compositions can be used to produce the resistive component having the required resistivity and the temperature coefficient of resistance according to the requirements of the product specifications. Although increasing the roughness of the upper oxide layer 320 increases adhesion of the protective layer 350, the higher roughness of the upper oxide layer 320 increases the process capability index (CP and/or CPK) of the resistive component, which causes longer laser trimming time and increases the working hours in production. Therefore, the centerline average roughness (Ra) of the surface of the upper oxide layer 320 is preferably set about 1100±500 Å.

Besides, the roughness can also be increased via the topography modifier in the etchant. The promoter can comprise an adhesion promoter and a coverage promoter. The adhesion promoter not only promotes the reaction between the topography modifier and the copper but also forms an organic film that does not dissolve in water on the surface of the resistive layer 340 (in one embodiment, including the upper oxide layer 320). The coverage promoter can increase the uniformity of the organic film.

Before the step (E) of forming the protective layer on the roughened surface, it is necessary to adjust the resistance value of the resistive component 300 by using a laser to trim the resistive layer 340. The step (E) of forming protective layer on the roughened surface, as shown in FIG. 3F, utilizes a printing method to form the protective layer 350 on the upper oxide layer 320.

Figure 3J:
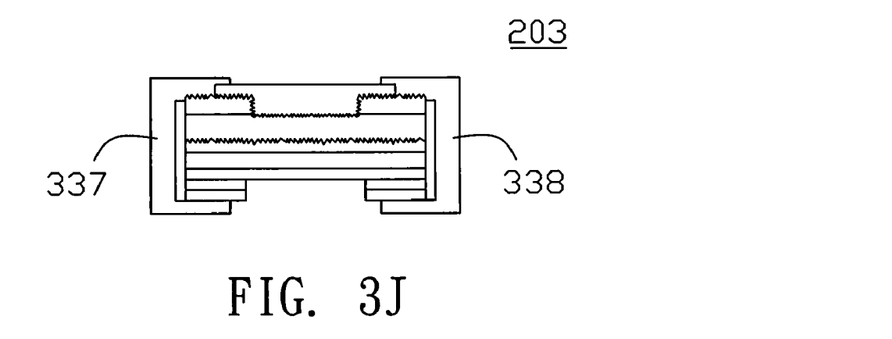

FIG. 3G shows the step (F) of cutting the laminated plate to form the resistive component. At first, the laminated plate 201 is cut into at least one laminated stripe 202 along the A-A direction (as shown in FIG. 3I). The terminal electrodes 335 & 336 are formed separately on the side surface of the laminated stripe 202 by the sputtering deposition method, as shown in FIG. 3I. Then, the laminated stripe 202 is cut into at least one laminated block 203 along the B-B direction, as shown in FIG. 3J. Then, the external electrodes 337 & 338 are formed on the side surface of the laminated block 203 via the barrel plating method. Thus, the resistive components 300 & 300' are completely fabricated.

An embodiment of the invention uses a lamination method to bond the resistive plate and the substrate and uses a wet etching process to form the oxide layer. The manufacturing process does not need the sintered process in a nitrogen environment at 960° C.~980° C. Compared to prior art, the process having high cost and high difficulty is avoided. According to an embodiment of the invention, the manufacturing process is simplified and the cost is reduced. The process stability is also increased.

Although the present invention has been fully described by way of examples with reference to the accompanying drawings, it should not be construed as any limitation on the implementation range of the invention. Various equivalent changes and modifications can be performed by those who are skilled in the art without deviating from the scope of the invention. The scope of the present invention is to be encompassed by the claims of the present invention. Any embodiment or claim of the present invention does not need to achieve all the disclosed objects, advantages, and characteristics described by the invention. Besides, the abstract and the title are only used for assisting the search of the patent documentation and should not be construed as any limitation on the range of implementation of the invention.

What is claimed is:

1. A resistive component, comprising:
    a carrier;
    a resistive layer disposed on the carrier and comprising copper alloy;
    an electrode unit electrically connected to the resistive layer;
    an upper oxide layer including a third oxide layer that is directly disposed on a part of a surface of the resistive layer wherein the third oxide layer comprises oxides of the resistive layer; and
    a protective layer covering at least part of the upper oxide layer.

2. The resistive component according to claim 1, wherein the copper alloy is nickel copper alloy whose nickel and copper are main compositions.

3. The resistive component according to claim 2, wherein the nickel copper alloy comprises about 55 wt % of copper, about 44 wt % of nickel and about 1 wt % of iron.

4. The resistive component according to claim 1, wherein the copper alloy is manganese copper alloy whose manganese and copper are main compositions.

5. The resistive component according to claim 4, wherein the manganese copper alloy comprises about 86 wt % of copper, about 12 wt % of manganese and about 2 wt % of nickel.

6. The resistive component according to claim 1, wherein the electrode unit comprises a pair of mutually separated upper electrodes that cover part of the resistive layer; and the upper oxide layer further comprises a first oxide layer and a second oxide layer that are directly disposed on a surface of the upper electrodes, the surface of the upper electrodes away from the resistive layer, wherein the first oxide layer and the second oxide layer comprise oxides of the upper electrodes.

7. The resistive component according to claim 6, wherein the upper oxide layer is a roughened surface formed by utilizing a wet etching process.

8. The resistive component according to claim 1, wherein the upper oxide layer is a roughened surface formed by utilizing a wet etching process.

9. The resistive component according to claim 8, wherein the centerline average roughness of the roughened surface is about between 600 Å and 1600 Å.

10. The resistive component according to claim 1, wherein the thickness of the upper oxide layer is about between 40 μm and 100 μm and the thickness of the resistive layer is about between 0.2 mm and 0.6 mm.

11. The resistive component according to claim 1, wherein the carrier comprises a substrate having an upper surface and a lower surface, an upper adhesion layer disposed on the upper surface of the substrate and a lower adhesion layer disposed on the lower surface of the substrate, wherein the upper adhesion layer is disposed between the resistive layer and the substrate.

12. The resistive component according to claim 11, wherein the upper adhesive layer and the lower adhesive layer are heat dissipating plates and the resistive component further comprises a metal layer that is connected to the lower adhesive layer.

13. The resistive component according to claim 1, wherein the resistive component is suitable to detect electric current in a circuit, the resistance value of the resistive component is lower than about 10 mΩ and the temperature coefficient of resistance of the resistive component is lower than about $100 \times 10^{-6}$/K.

14. A method for manufacturing a resistive component, the method comprising:
    providing a multilayer laminated plate formed by a substrate and a resistor comprising copper alloy;
    removing a part of the resistor to form a plurality of resistive layers separated from each other;
    performing oxidation treatment to form a roughened surface comprising copper alloy oxide on a part of the resistive layer;
    forming a protective layer on the roughened surface; and
    cutting the laminated plate to form the resistive component.

15. The method according to claim 14, further comprising disposing an upper adhesive layer between the resistor and the substrate wherein the resistor is a resistive plate and forming the laminated plate by laminating the resistive plate, the upper adhesive layer and the substrate.

16. The method according to claim 15, wherein the step of providing the multilayer laminated plate comprising the resistor and the substrate further comprises a step of performing oxidation treatment on a surface of the resistive plate to form a roughened surface.

17. The method according to claim 14, wherein the laminated plate is formed by depositing a resistive film onto the substrate via a thin film process and the resistive film forms the resistor.

18. The method according to claim 14, wherein the oxidation treatment comprises a wet etching process.

19. The method according to claim 18, wherein an etchant is used in the wet etching process, the etchant comprises an oxidant and an additive, and the additive includes a topography modifier, an adhesion promoter and a coverage promoter.

20. The method according to claim 14, wherein the step of removing a part of the resistor to form a plurality of resistive layers separated from each other further comprises forming a plurality of conductive bumps on a part of the surface of the resistive layers.

21. The method according to claim 20, wherein the step of performing oxidation treatment to form a roughened surface on a part of the resistive layer further comprises performing oxidation treatment to form a roughened surface on the conductive bumps.

22. The method according to claim 14, wherein the copper alloy is either manganese copper alloy whose manganese and copper are main compositions or nickel copper alloy whose nickel and copper are main compositions.

* * * * *